C. HOADLEY.
MOTOR VEHICLE.
APPLICATION FILED FEB. 11, 1911.

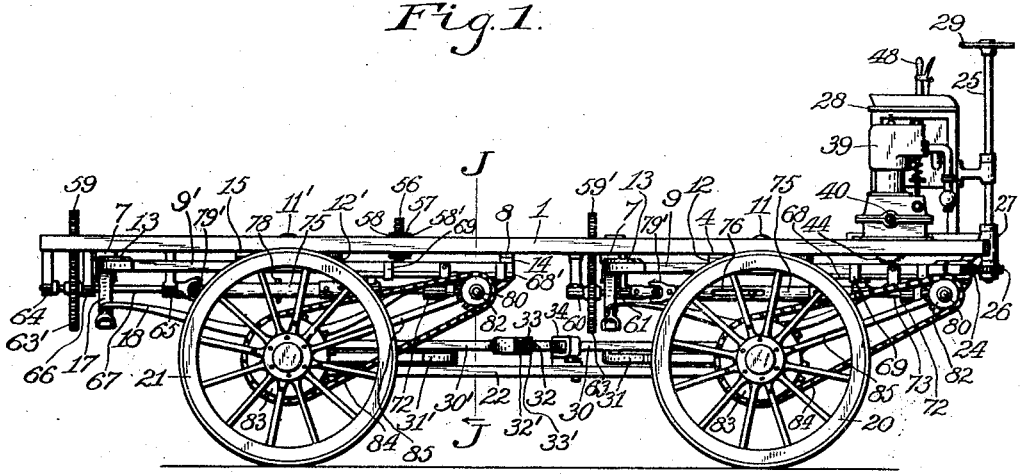
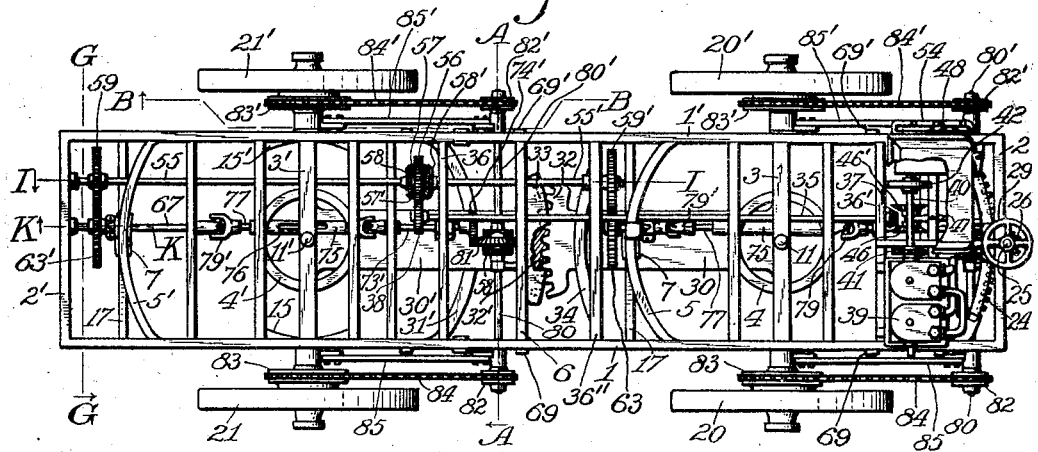
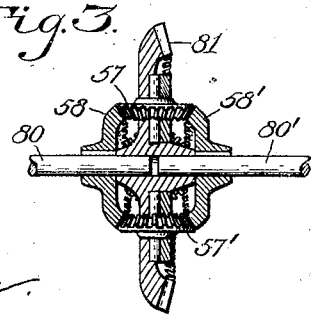

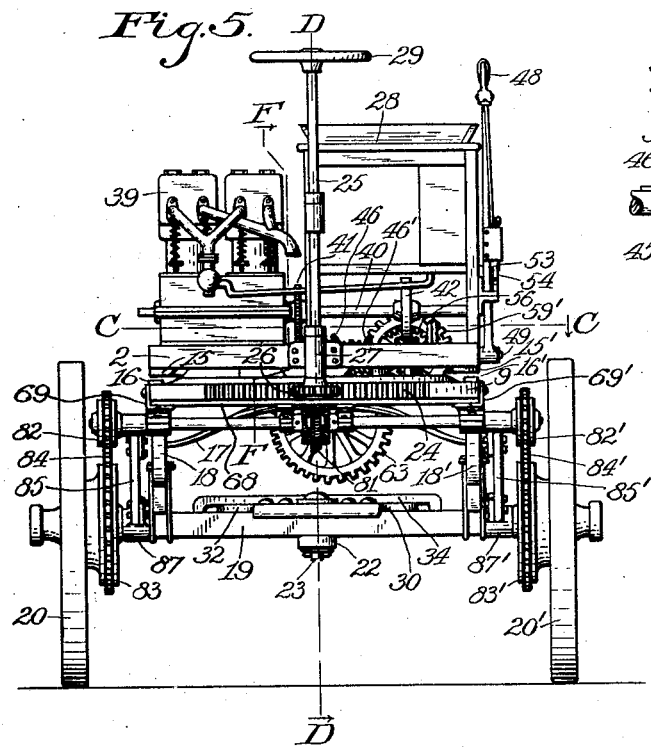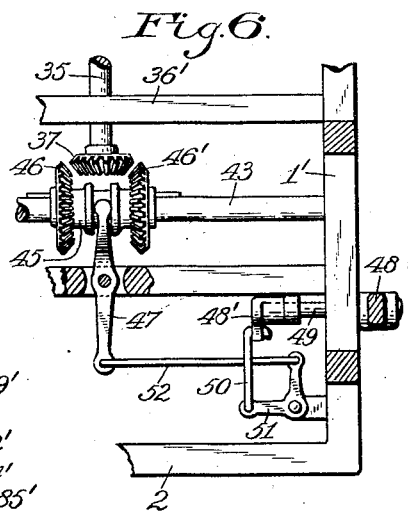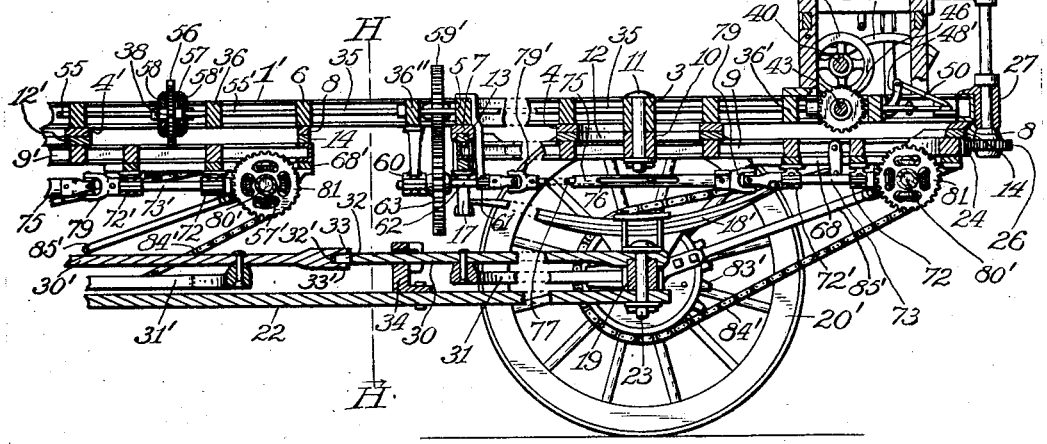

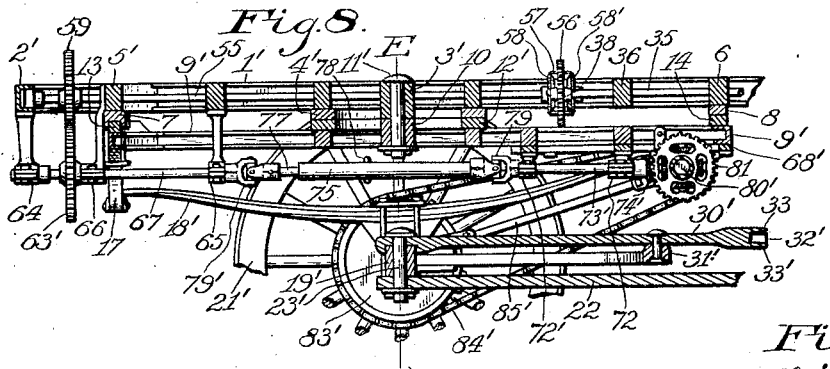

1,027,730.

Patented May 28, 1912.

6 SHEETS—SHEET 4.

WITNESSES:
J. H. Gardner
K. R. Woddell

INVENTOR:
Claud Hoadley,
BY
E. F. Silvius,
ATTORNEY.

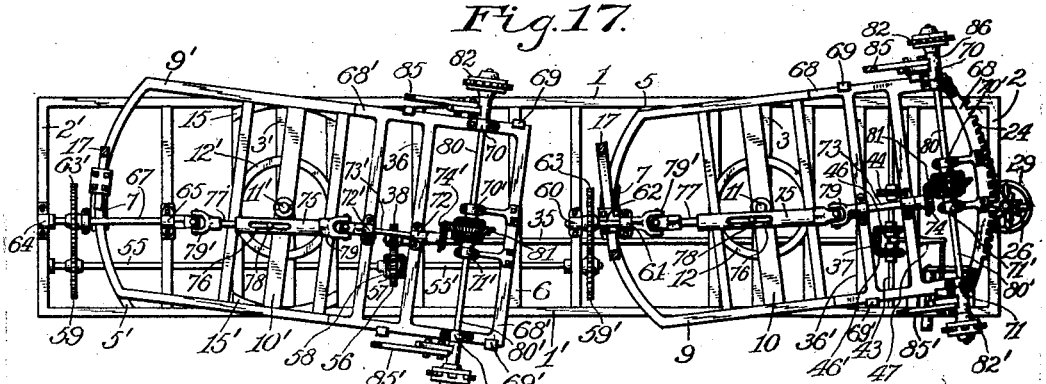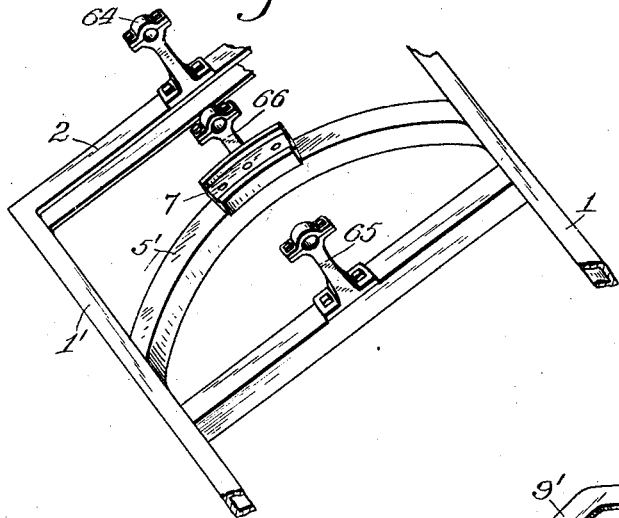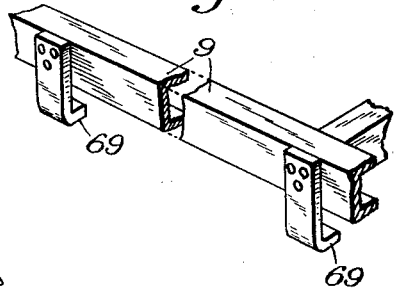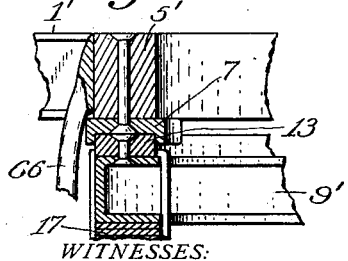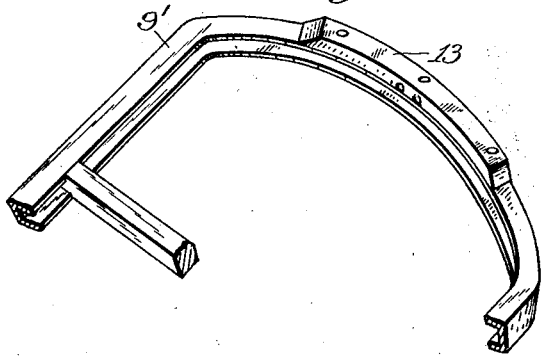

C. HOADLEY.
MOTOR VEHICLE.
APPLICATION FILED FEB. 11, 1911.
1,027,730.
Patented May 28, 1912.
6 SHEETS—SHEET 6.
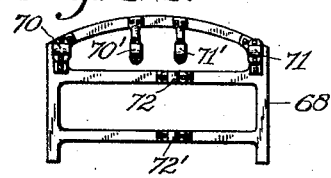
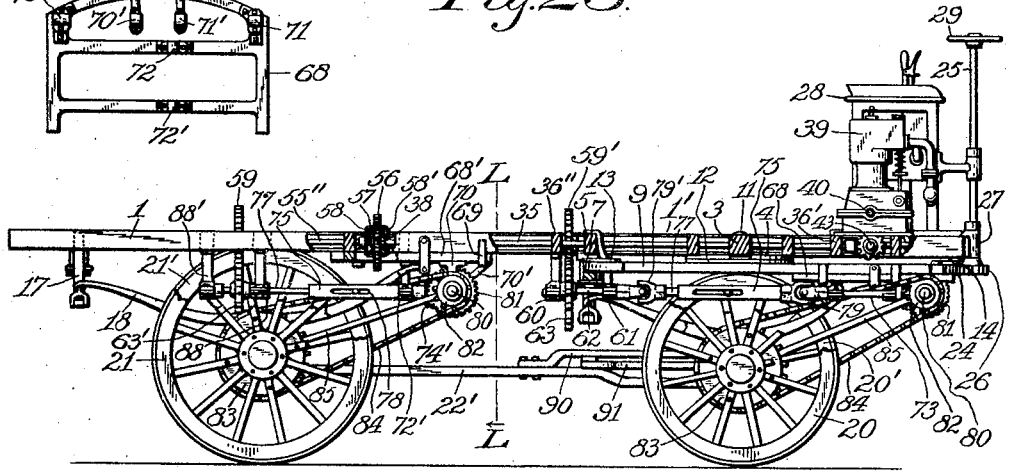
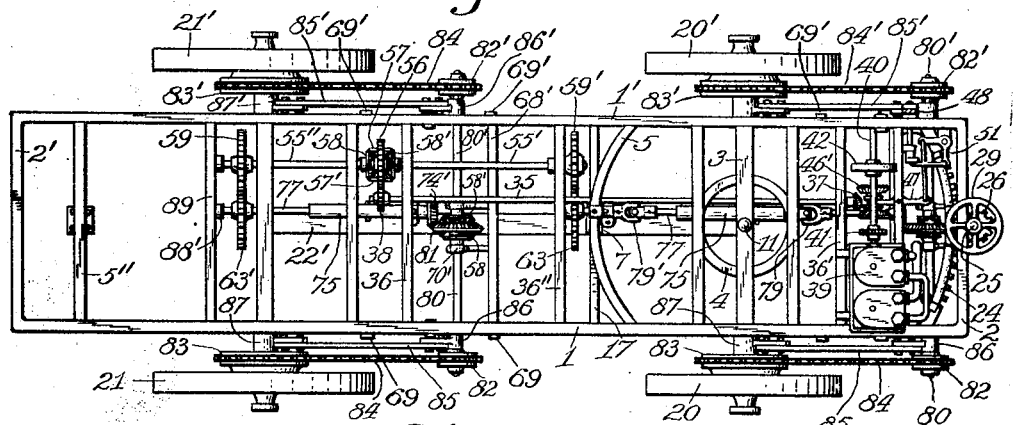
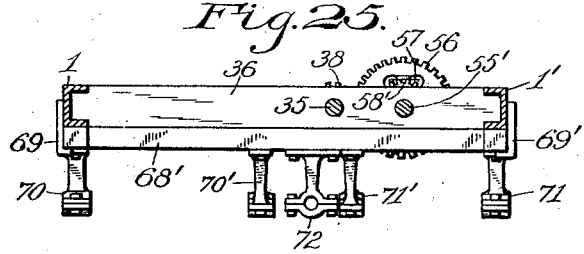
WITNESSES:
J. H. Gardner.
K. R. Woddell.
INVENTOR:
Claud Hoadley,
BY
E. T. Silvius,
ATTORNEY.

UNITED STATES PATENT OFFICE.

CLAUD HOADLEY, OF GOSPORT, INDIANA.

MOTOR-VEHICLE.

1,027,730.

Specification of Letters Patent.

Patented May 28, 1912.

Application filed February 11, 1911. Serial No. 607,924.

*To all whom it may concern:*

Be it known that I, CLAUD HOADLEY, a citizen of the United States, residing at Gosport, in the county of Owen and State of Indiana, have invented a new and useful Motor-Vehicle, of which the following is a specification, reference being had to the accompanying drawings and to the letters and figures of reference marked thereon.

This invention relates to vehicles of the larger size that are adapted to be used for hauling relatively heavy loads, such as merchandise or farm produce, the invention having reference more particularly to the class of motor vehicles that is adapted to be used in fields or on country roads, the object of the invention being to provide an improved motor vehicle in which the power may be applied to all the carrying wheels, and to provide an improved four wheeled vehicle of the above-mentioned character that will be adapted to turn in the minimum amount of space, a further object being to provide improved transmission gearing for connecting a motor or engine with the carrying wheels of the vehicle.

With the above-mentioned and minor objects in view, the invention consists in an improved vehicle or wagon comprising a main frame, two trucks provided with springs which support the main frame, each truck having two carrying wheels, a motor on the main frame, and transmission gearing of novel construction connecting the motor with the wheels and provided with differential gearing arranged in a novel manner for equalizing the power of the engine as between the two trucks and also the two wheels of each track, the invention comprising also improvements in the running gear to adapt the same to the requirements of the transmission gearing.

The invention consists also in the novel parts and combinations and arrangements of parts, as hereinafter particularly described and claimed.

Figure 13:
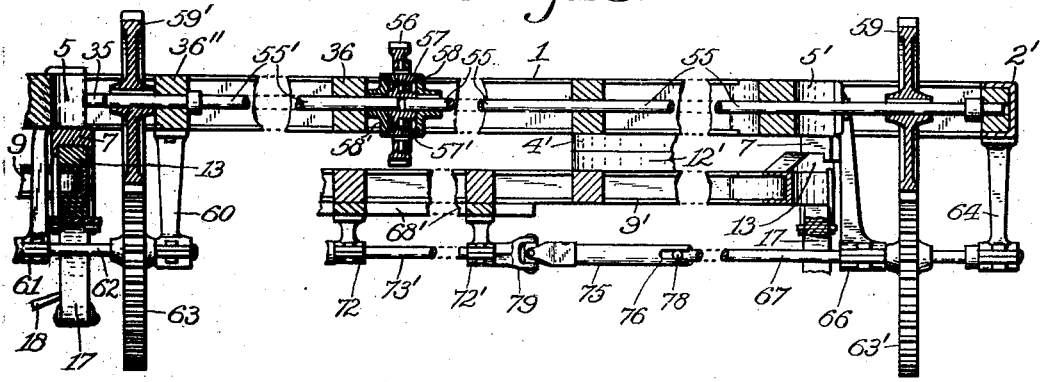
Figure 14:
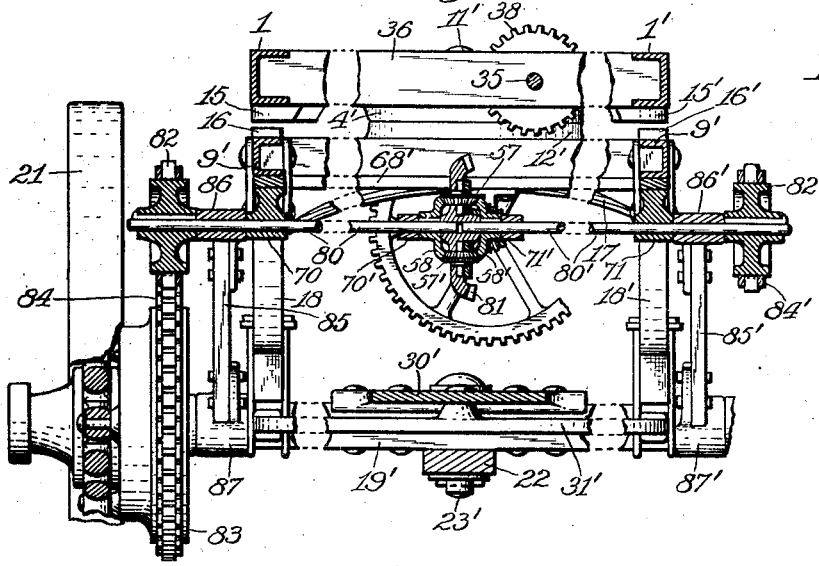
Figure 15:
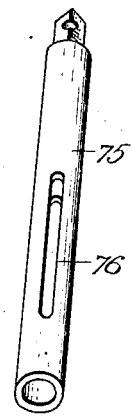
Figure 16:
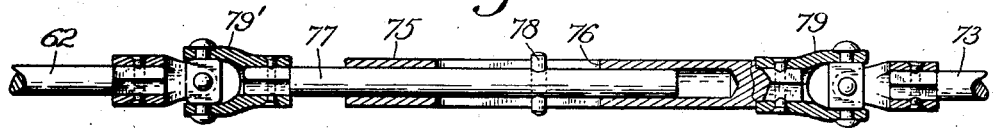

Referring to the drawings, Figure 1 is a side elevation of the improved vehicle minus the body or bed for holding the load; Fig. 2, a top plan thereof; Fig. 3, a sectional view of a form of differential gearing preferably employed, as on the plane of the line A A in Fig. 2; Fig. 4, a fragmentary section on the line B B in Fig. 2; Fig. 5, a rear elevation of the vehicle; Fig. 6, a fragmentary plan of the main frame with parts of the gearing thereon; Fig. 7, a fragmentary vertical section on the plane of the line D D in Fig. 5; Fig. 8, a fragmentary section also on the line D D showing the rear portion of the vehicle; Fig. 9, a transverse vertical section on the plane of the line E E in Fig. 8; Fig. 10, a fragmentary section on the line F F in Fig. 5; Fig. 11, a fragmentary rear elevation of the vehicle; Fig. 12, a fragmentary section on the plane of the line H H in Fig. 7; Fig. 13, a fragmentary sectional elevation on the plane of the line I I in Fig. 2; Fig. 14, a fragmentary sectional elevation on the plane of the line J J in Fig. 1; Fig. 15, a perspective view of a portion of one of the extensible shafts employed; Fig. 16, a longitudinal sectional view of the extensible shaft provided with universal couplings; Fig. 17, an inverted plan view of the main frame and truck frames and also gearing mounted thereon; Fig. 18, a fragmentary perspective view showing a portion of the main frame; Fig. 19, a fragmentary perspective view showing portions of the truck frames; Fig. 20, a fragmentary sectional elevation on the line K K in Fig. 2; Fig. 21, a fragmentary perspective view showing a portion of a truck frame; Fig. 22, an inverted plan of a sliding gear frame for compensating for the rise and fall of the vehicle body on its springs relative to the axles; Fig. 23, a side elevation partially in section of the vehicle slightly modified so that the rear axle can not turn; Fig. 24, a top plan of the modified construction shown in the preceding figure; and Fig. 25, a fragmentary section on the line L L in Fig. 23.

Similar reference characters throughout the different figures of the drawings indicate corresponding elements or features of construction herein referred to and described.

The illustrations include the essential features of construction in the preferred form without the bed or body obviously required for holding the load, it being clear that such bed or body may be variously constructed to suit requirements.

A suitable main frame is provided which preferably comprises two side rails 1 and 1' and transverse end rails 2 and 2' connected to the side rails, and such additional transverse rails as may be desired, the side rails having two body bolsters 3 and 3' connected thereto, and suitable center plates or fifth wheels 4 and 4' are provided at the under side of the main frame, the latter including transverse rails 5, 5', 6, the rails 5 and 5' being preferably provided on their under sides each with a guide-shoe 7 for the rear ends of the trucks, suitable guide plates 8 being provided for the forward ends of the trucks, to prevent the trucks from tilting.

The two trucks preferably employed are substantially alike in all essentials, there being a forward truck frame 9 and a rear truck frame 9' of suitable construction, including truck bolsters 10 and 10', respectively, which are connected to the body bolsters by means of center pins 11 and 11', respectively, the truck frames having center plates 12 and 12' respectively, supporting the center plates of the main frame. The rear end of each truck frame preferably has a rubbing plate 13 thereon that is adapted to slide in contact with the plate or shoe 7, the forward end of each truck frame having a rubbing plate 14 thereon adapted to slide against the plate or shoe 8. When the vehicle is adapted to be steered partly by the rear axle, the main frame preferably is provided with side bearings 15 and 15' at opposite sides of the center-pin for the rear truck, and the rear truck frame is provided with two side bearings 16 and 16' arranged oppositely to the side bearings of the main frame to prevent the latter from tilting to an undesirable extent. The rear portion of each truck frame has a spring 17 arranged transversely and secured thereto, the ends of the spring being connected with the rear ends of two springs 18 and 18' which have their forward ends connected to the forward portion of the truck frame, the middle portion of the springs 18 and 18' of the forward truck being mounted on an axle 19 and the corresponding springs of the rear truck being mounted on an axle 19'. Two wheels 20 and 20' are mounted rotatively on the forward axle and two other wheels 21 and 21' are mounted rotatively on the rear axle. A coupling-bar 22 is connected to the forward and rear axles by means of coupling pins 23 and 23', respectively, the axles being arranged below the bolsters and the coupling-pins being approximately in alinement with the center-pins 11 and 11', respectively, so that the axles are maintained at a predetermined distance apart at their pivotal centers.

Suitable steering gear is provided which preferably comprises a toothed quadrant 24 arranged fixedly on the forward end of the forward truck frame 9, a steering shaft 25 having a pinion 26 secured to the lower end thereof, the shaft being rotatively mounted uprightly in a box 27 secured to the forward portion of the main frame, the pinion being in mesh with the quadrant. The shaft 25 is arranged in proximity to an operator's seat 28 mounted on the main frame, and the upper end of the shaft is provided with a steering wheel 29. Two segment-arms 30 and 30' are secured rigidly to the axles 19 and 19', respectively, and extend each toward the other an equal distance substantially parallel to the coupling bar 22, and the arms are provided with braces 31 and 31', respectively, each brace being substantially bow shaped and secured at its middle portion to the arm and having its ends secured to the axle to which the arm is attached. The free end of one arm has a toothed segment 32 thereon and the adjacent end of the other arm has a toothed segment 32' thereon meshing with the segment 32, one segment having opposing flanges 33 and 33' which extend over into contact with opposite sides of the coöperating segment so that the two segments are maintained in one and the same horizontal plane. When the vehicle is excessively long it is preferable to provide a guide 34 for one of the segment arms for preventing excessive vibrations of the arms on rough roads, the guide preferably being supported by the coupling bar 22. It will be evident that when the forward truck is turned in one direction the gear segments cause the rear truck to turn in the opposite direction, or relatively as illustrated in Fig. 17.

A main shaft 35 is rotatably supported in the main frame, preferably in transverse members 36, 36', 36", the shaft preferably extending through the transverse members 5 and 6 and the bolster 3. Power is suitably applied to the main shaft preferably by means of a bevel gear wheel 37 secured to the forward end of the shaft, and the power is transmitted by means of the spur toothed wheel 38 secured to the rear end of the shaft. The power preferably is generated by means of an explosion engine 39 mounted on the forward portion of the main frame, the engine including a main shaft 40 having a gear-wheel 41 and preferably a balance wheel 42 secured thereto. A counter shaft 43 is mounted in the main frame below the shaft 40 and has a gear wheel 44 secured thereto which is in mesh with the wheel 41. A sleeve 45 is splined on the counter-shaft 43 and has two bevel gear wheels 46 and 46' thereon adapted to separately engage the wheel 37 so that the shaft 35 may be rotated in either direction, the sleeve being controlled and operated by means of a lever 47 suitably mounted on the main frame, and a reverse lever 48 mounted also on the main frame and extending adjacently to the operator's seat, the lever 48 being secured to a shaft 49 to which an arm 48' is secured and suitably connected with the lever 47, as by means of a connecting rod 50 having connection with the arm and also with a bell crank 51 mounted on the main frame, and a connecting rod 52 having connection with the bell crank and the lever 47. The lever 48 is provided with a latch 53 normally engaging a quadrant 54 mounted on the frame of the operator's seat. Two main equalizing shafts 55 and 55' are mounted in alinement each with the other in the main frame, preferably in the horizontal plane in which the main shaft 35 is mounted, and supported by transverse members of the main frame parallel to the shaft 35. The shafts 55 and 55' are connected together by suitable differential gearing, preferably comprising a spur-toothed wheel 56 mounted rotatively on adjacent end portions of the two shafts in mesh with the wheel 38 and carrying a suitable number of rotative bevel gear wheels 57, 57', which mesh with two opposing bevel gear wheels 58 and 58' secured to the adjacent end portions of the shafts 55 and 55', respectively. A spur toothed gear wheel 59 is secured to the shaft 55 and a similar wheel 59' is secured to the shaft 55'. The main frame is provided with two shaft hangers 60 and 61 in which a counter-shaft 62 is rotatively mounted, the latter shaft having a gear-wheel 63 secured thereto that meshes with the gear-wheel 59' for transmitting motion to the forward truck-wheels. The rear portion of the main frame is provided with shaft hangers 64 and 65 and preferably a hanger 66 in which is rotatively mounted a counter-shaft 67 having a gear wheel 63' secured thereto and meshing with the gear-wheel 59 for transmitting motion to the rear truck wheels.

The forward truck frame is provided with a movable gear frame 68 and the rear truck frame is provided with a similar movable gear frame 68', each gear frame being slidingly guided on the under side of the forward portion of the truck frame by means of a suitable number of guides 69 and 69' secured to the main portion of the truck frame. Each gear-frame has shaft hangers 70, 70', 71, 71', mounted in alinement on the under side thereof for supporting alining transverse shafts, each gear frame having also two shaft hangers 72, 72', on the under side thereof for supporting a counter-shaft longitudinally, the hangers 72, 72', of the gear frame 68 rotatively supporting a shaft 73 having a bevel gear wheel 74 secured to its forward end, the corresponding hangers of the gear frame 68' rotatively supporting a shaft 73' having a bevel gear wheel 74' secured to its forward end. Normally the counter-shafts 73 and 73' are mounted on the movable gear frames or in alinement with the counter-shafts 62 and 67 mounted on the main frame, and as will be seen the shaft 73 may be carried bodily toward or from the shaft 62 and may be turned at an angle thereto in a horizontal plane, and also the shaft 73' may be moved with respect to the shaft 67 in the same manner, when the trucks are turned for steering purposes; the longitudinal movement of the shafts on the truck frames resulting from the action of the truck springs, as will further appear.

An extensible or contractible shaft section is provided which comprises a hollow part 75 having a longitudinal slot 76 in the wall thereof, and a solid cylindrical part 77 extending movably into the hollow part and having a lateral lug 78 thereon extending into and movable in a slot 76 so that either part may rotate the other, and one part has a suitable universal coupling 79 connected thereto, and the other part has a similar universal coupling 79' secured thereto, one universal coupling being connected to the counter-shaft 73 and the other universal coupling being connected to the counter-shaft 62, so that the shafts 62 and 73 and the parts 75 and 77 and universal couplings together constitute a flexible and extensible or contractible transmission-shaft. When the rear truck is movable relative to the main frame the universal couplings of a similar extensible or contractible shaft section are connected to the shafts 73' and 67.

Each truck frame is provided with two wheel-equalizing shafts 80 and 80' which are rotatively mounted in the hangers 70 and 70' and the hangers 71 and 71', respectively, of the movable gear frame, the shafts being in alinement and their inner adjacent ends being connected together by suitable differential gearing preferably comprising a bevel gear wheel 81 rotatively mounted on the end portions of the shafts and meshing with the gear wheel 74 or 74', the wheel 81 carrying the wheels 57, which are in mesh with the two wheels 58 and 58' secured to the shafts, all the differential gearings being substantially alike as hereinbefore described and more clearly shown in Fig. 3, but obviously various forms of differential gearing may be employed for connecting the shafts specified. The outer ends of the shafts 80 and 80' have sprocket-wheels 82 and 82' secured thereto, respectively, and each pair of carrying wheels, as 20 and 20' have sprocket-wheels 83 and 83' secured thereto, respectively, and connected by sprocket-chains 84 and 84' with the sprocket-wheels 82 and 82', respectively. It will be seen from the foregoing that the power may be transmitted equally to all the four carrying or driving wheels. The shafts 80 and 80' are provided with a pair of radius bars 85 and 85', respectively, for maintaining the shafts at a constant distance from the main axle, so as to prevent the sprocket-chains from becoming slack, the radius bars being preferably provided with bosses 86 and 86' rotatively connected with the shafts 80 and 80', respectively, and bosses 87 and 87' rotatively connected to the axle on which the wheels are driven by the adjacent sprocket-chains.

In some cases, if the vehicle be extremely short it may not be desirable to use the rear axle for assisting in steering, in which case the rear truck frame may be dispensed with, and the gear frame 68' may be slidingly mounted on the main frame, as illustrated in Figs. 23 to 25, the main frame being provided with the guides 69 and 69', the springs 17 and 18 and 18', being connected also to the main frame; also, the universal couplings are not required, and a relatively shorter shaft 55'' is connected by means of the differential gearing with the shaft 55' and has the gear wheel 59 secured thereto, the shaft part 77 being supported by hangers 88 and 88' mounted on the main frame members 89 and having the gear-wheel 63' secured thereto that meshes with the wheel 59; and in this case the bevel gear-wheel 74' is secured directly to the part 75 of the shaft section so that the counter-shaft is extensible, but not flexible laterally, the gearing otherwise being constructed and arranged substantially as above-described, a transverse member 5'' of the main frame resting on the spring 17. If desired a coupling-bar or pole 22' may be employed for connecting the axles together and have a guide 90 thereon, and the forward axle may be provided with a hound 91 for steadying the axle, the rear end of the coupling-bar 22' being secured rigidly to the rear axle.

It should be understood that the gearing for reversing the motion of the vehicle may be variously constructed and arranged other than as herein described, and that the rate of speed may be varied by various means, various modifications being contemplated within the scope of the appended claims.

In practical use, the operator is within convenient reach of the reversing lever 48 and the steering wheel 29 and is convenient also to the engine or motor, so that all movements of the machinery may be controlled. During steering operations the power is transmitted equally to all the wheels so that smooth and steady operation of the gearing results and the benefit derived from the use of springs is obtained without the evil incident to the use of slack sprocket chains.

Having thus described the invention, what is claimed as new, is—

1. A vehicle including a main frame, two axles, two pairs of driving wheels rotatable on the two axles respectively, two series of springs mounted on the two axles respectively, two truck frames mounted on the two series of springs respectively and pivoted to the main frame, each truck frame having a gear frame thereon that is movable longitudinally of the main frame and provided with equalizing transmission gearing that is connected with a different one of the two pairs of driving wheels, each transmission gearing including an extensible or contractible and laterally flexible shaft that is journaled on the main frame, and two driving shafts mounted on the main frame and connected with the two extensible or contractible and flexible shafts respectively.

2. A vehicle including a frame having equalizing gearing mounted to move bodily thereon, a drive-wheel mounted on the frame, springs supporting the frame, an axle supporting the springs, wheels rotative on the axle and operatively connected with the equalizing gearing, radius-bars connected with the axle and also with the equalizing gearing for controlling the movement of the latter relatively to the frame, and an extensible or contractible shaft having one end rotatively supported on the frame and provided with a gear wheel meshing with the drive-wheel, the opposite end of the shaft being geared to and movable with the equalizing gearing.

3. A vehicle including a main frame, a drive-shaft mounted rotatively on the main frame and having a toothed wheel thereon, a pair of drive-wheels having each a sprocket-wheel thereon, an axle mounted in the wheels, springs mounted on the axle, a truck-frame mounted on the springs and pivoted to the main frame, a gear-frame mounted movably on the truck-frame and having two equalizing-shafts mounted rotatively thereon, each equalizing shaft having a sprocket-wheel thereon, sprocket-chains connecting the sprocket-wheels of the equalizing shafts with the sprocket-wheels of the drive-wheels, differential gearing connected with the two equalizing-shafts, and a flexible extensible or contractible counter-shaft having one end thereof journaled on the main frame and provided with a toothed wheel that is in mesh with the toothed wheel of the drive-shaft, the counter-shaft having its opposite end journaled on the gear-frame and provided with a gear wheel that is connected with the differential gearing.

4. In a motor vehicle, the combination of a main frame, two trucks, each comprising a truck-frame pivoted to the main frame, springs connected to the truck-frame, an axle connected to the springs, two wheels rotative on the axle and having each a sprocket-wheel thereon, a gear-frame mounted on the truck-frame and movable thereon toward or from the pivot of the truck-frame, two equalizing-shafts rotatively mounted on the gear-frame and geared to the sprocket-wheels, radius-bars pivotally connected to the equalizing-shafts and the axle, and differential gearing connecting the two equalizing shafts together, with driving mechanism mounted on the main frame, and two series of flexible gearing, each series connecting the differential gearing of a truck with the driving mechanism.

5. In a motor vehicle, the combination of a main frame, a main shaft rotatively mounted on the main frame, a gear-wheel secured to the main shaft, two main equalizing-shafts mounted rotatively in alinement on the main frame, equalizing gearing connected with the two main equalizing-shafts and also with the gear-wheel that is secured to the main shaft, and two counter-shafts mounted rotatively on the main frame and geared to the two main equalizing shafts respectively, with two pairs of carrying wheels, two axles, each mounted in a pair of the carrying wheels, supporting connections between the axles and the main frame, separate series of gearing connected with the carrying wheels, a series for each wheel, and two series of transmission gearing, each series connected with a different one of the counter-shafts and a different one of the separate series of gearing.

6. In a motor vehicle, the combination with a main frame, and a motor mounted on the main frame, of a main shaft mounted rotatively on the main frame, gearing for connecting the main shaft with the motor, two extensible or contractible transmission shafts rotatively supported at one end on the main frame, gearing connecting the two transmission shafts with the main shaft, two truck frames connected to the main frame, two gear frames mounted to move longitudinally on the two truck frames respectively, two equalizing shafts mounted on one of the gear frames and provided with differential gearing that is geared to the opposite end of one of the transmission shafts, and two equalizing shafts mounted on the remaining one of the gear frames and provided with differential gearing that is geared to the opposite end of the remaining one of the transmission shafts.

7. In a motor-vehicle, the combination with a main frame, and a motor mounted on the main frame, of a main shaft mounted rotatively on the main frame, gearing for connecting the main shaft with the motor, two main equalizing-shafts mounted rotatively on the main frame and having each a gear-wheel secured thereto, differential gearing connected with the two main equalizing-shafts and geared with the main shaft, two extensible or contractible transmission-shafts, each supported at one end on the main frame, the end of one of the transmission-shafts being geared to one of the main equalizing-shafts, the end of the other one of the transmission-shafts being geared to the remaining one of the main equalizing shafts, two gear-frames mounted to move toward or from the transmission-shafts, two equalizing-shafts mounted on one of the gear-frames and provided with differential gearing that is geared to the opposite end of one of the transmission-shafts, and two equalizing shafts mounted on the remaining one of the gear-frames and provided with differential gearing that is geared to the opposite end of the remaining one of the transmission shafts.

8. In a motor vehicle, the combination with a main frame, two carrying wheels, an axle mounted in the carrying wheels, and springs interposed between the axle and the main frame, of a transmission shaft comprising two parts, one part being hollow and the other part being movable longitudinally in the hollow part; a hanger secured to the main frame and rotatively supporting one of the parts of the transmission shaft, a gear-frame mounted to move in a plane between the axle and the main frame toward or from the hanger, two equalizing-shafts mounted on the gear-frame and geared to the two carrying wheels respectively, differential gearing connected with the two equalizing-shafts, and gearing connecting the remaining one of the parts of the transmission-shaft with the differential gearing.

In testimony whereof, I affix my signature in presence of two witnesses.

CLAUD HOADLEY.

Witnesses:
EDWIN HOADLEY,
A. H. WAMPLER.